United States Patent
Gopalakrishnan et al.

(10) Patent No.: US 7,092,731 B2
(45) Date of Patent: Aug. 15, 2006

(54) METHOD FOR IMPROVING CAPACITY OF A REVERSE LINK CHANNEL IN A WIRELESS NETWORK

(75) Inventors: Nandu Gopalakrishnan, Chatham, NJ (US); Sudhir Ramakrishna, Scotch Plains, NJ (US); Ganapathy Subramanian Sundaram, Hillsborough, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 519 days.

(21) Appl. No.: 10/382,563

(22) Filed: Mar. 6, 2003

(65) Prior Publication Data

US 2004/0176124 A1    Sep. 9, 2004

(51) Int. Cl.
*H04B 7/00* (2006.01)
*H04Q 7/20* (2006.01)

(52) U.S. Cl. .............. 455/522; 455/69; 455/452.2; 455/67.11

(58) Field of Classification Search ............ 455/522, 455/69, 13.4, 134, 226.2, 127.1, 127.2, 127.5, 455/455, 450, 452.1, 452.2, 509, 516, 70, 455/67.11; 370/318, 311, 313, 348, 335, 370/449
See application file for complete search history.

(56) References Cited

U.S. PATENT DOCUMENTS

| 5,933,781 | A | | 8/1999 | Willenegger et al. | ........ 455/522 |
| 5,974,094 | A | * | 10/1999 | Fines et al. | ........... 375/335 |
| 6,580,899 | B1 | * | 6/2003 | Dalgleish et al. | .......... 455/69 |
| 6,914,889 | B1 | * | 7/2005 | Bi et al. | ............ 370/318 |

FOREIGN PATENT DOCUMENTS

| WO | WO 01/67631 A3 | 9/2001 |
| WO | WO 01/95521 A | 12/2001 |
| WO | WO 01/95521 A2 * | 12/2002 |

* cited by examiner

*Primary Examiner*—Edward F. Urban
*Assistant Examiner*—John J. Lee
(74) *Attorney, Agent, or Firm*—Christopher Malvone; Stephen M. Gurey

(57) ABSTRACT

The capacity of a reverse link is improved by realizing a scheme to effect sharp changes in pilot channel transmit power (PCTP) and data channel to pilot power ratio (DCPR), coordinated with the start of the data channel transmission. The change in pilot power and data channel to pilot power ratio is also applicable to mobiles that use multiple pilots and/or multiple antennas at the transmitter and/or receiver.

10 Claims, 2 Drawing Sheets

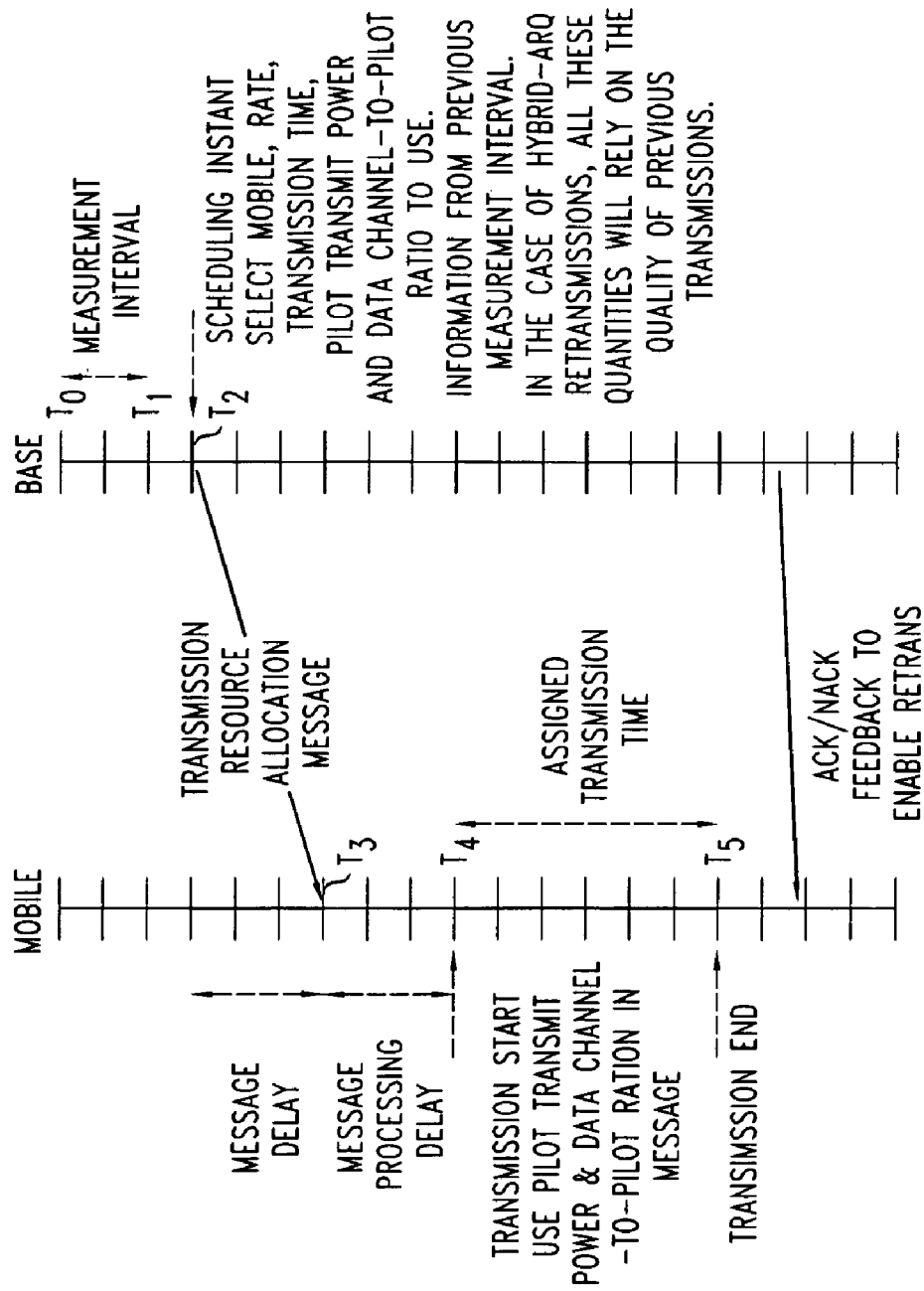

METHOD FOR IMPROVING CAPACITY OF A REVERSE LINK CHANNEL IN A WIRELESS NETWORK

BACKGROUND OF THE INVENTION

1. Field of the Invention

The invention relates to a wireless communications network and more particularly to improve the capacity of a reverse link of a communication channel.

2. Background of the Invention

In a wireless network the communication is described in terms of Forward Link (FL) and Reverse Link (RL). The Forward Link and Reverse Links are also referred to as Down Link (DL) and Up Link (UL) respectively. The forward link refers to the transmission from the Base Station (BS) also referred to as Cell to a Mobile Station (MS) and the reverse link refers to the transmission from the MS to a BS. A Mobile Station could be a voice terminal or a data terminal or a combination thereof. Both forward and reverse links transfer or carry content of voice, data, video or any other digital information from one end to the other end. The information transmitted from a Base Station to a specific Mobile Station is uniquely identified in nature compared to the information transmitted to the rest of the mobile stations present in a system at any given time. In code division multiple access (CDMA) systems, the uniqueness is governed by the Orthogonal Walsh functions used to spread or modulate a specific user's data in the Forward link. However, in the Reverse Link, the uniqueness of a specific user's data is governed by the user specific code that will identify the reverse link transmissions.

FIG. 1 depicts a cluster of base stations also referred as cells of a wireless network 1. This cluster consists a center Cell 1 surrounded by plurality of other cells. The identification of a center cell is just a notation to discuss the operation of that cell with respect to its surrounding cells. For example, when the discussion is focused on Cell 1 then the surrounding cells referred to as Tier 1 cells are the cells that are adjacent to all of its sides. In the FIG. 1, these are Cell 2, Cell 3, Cell 4, Cell 5, Cell 6, and Cell 7.

The objective of a system design of the Reverse Link of a CDMA-based system consisting of both voice and data users is to optimize capacity of a system in terms of the data throughput received at the Base Station while maintaining all users at their required quality of service level. The design goal is to make sure that the signal strength received at a base station from every mobile station in that cell is ideally equal to each other. The signal received at the base station from a particular mobile station is interfered with, and its quality of reception at the intended base station is degraded by, the cumulative sum of all the signals received from all the users of that base station referred to as Intra-cell and users of all its surrounding base stations referred to as Inter-cell interference. The design goal of a CDMA system is to minimize all kinds of interference at a given base station.

In the reverse link of a CDMA wireless system, the received signal power at the base station is the main resource that is shared. This resource is bound by the amount of power that can be accumulated due to signal reception from all the mobiles in the network, at the same time maintaining the ability to decode each of the signals. The higher the received power in a signal, the better the decoding ability of that signal at the base station but on the other hand, if the received power from one user is high, it leads to a higher interference to another user who is also transmitting at the same time. The goal of optimizing the level of signal received from each mobile is to balance between these contradictory requirements of expecting to receive a higher power of signal from a user at the same time making sure that the power received from all the other mobiles is decodable. In other words, the goal is maximizing the received power from a particular user while limiting the interference seen by the other users.

SUMMARY OF THE INVENTION

An embodiment of the resource allocation method of the present invention calculates the mobile pilot channel transmit power and the mobile data channel-to-pilot ratio (DCPR) as a part of the transmission resource, and conveys to the scheduled data users information for determining the actual pilot channel transmit power (PCTP) to use at the start of transmission, and the data channel-to-pilot ratio (or the offset from the default value of the appropriate data channel-to-pilot ratio from a pre-determined look-up table) to use during transmission.

BRIEF DESCRIPTION OF THE DRAWINGS

The present invention is more fully understood from the detailed description provided below and the accompanying drawings, which are given by way of illustration only. The reference numerals designate corresponding elements in the various drawings, and wherein:

FIG. 3 illustrates a step-by-step procedure of an embodiment of the present invention.

DETAILED DESCRIPTION

This received power resource is translated into a transmission rate and a transmission time interval that a MS can use to transmit its data content. The rate of data transmission depends on the amount of power used by the MS in its RL transmission to the BS. The higher rate of transmissions of data users implies higher the transmit powers and that in turn, given the mutual interference characteristics of the Reverse Link, implies a lower quality of other received signals from other users at the base station. In order to demodulate the Reverse Link signal received from a specific user, the base station needs to estimate certain channel parameters associated with the Pilot signal associated with the reverse link of that user or mobile station. These channel parameters are used to demodulate the received signal from a user. The quality of the received pilot signal estimation is proportional to the accuracy of the channel estimation parameters. The reliability of the channel parameters estimation decreases as the quality of the received signal decreases. Hence, the resource assignments at a base station that is the amount of power a specific user's signal is received at the base station should be just enough to ensure an acceptable signal quality for accurate demodulation of user data.

One embodiment of the invention will be described in the context of CDMA2000 system. However, the principles of the present invention are also applicable to other CDMA systems such as 1xEV-DO (aka HRPD), UMTS systems etc.

In order to aid in channel estimation and signal demodulation, mobile users transmit a predefined signal known as a pilot signal in a channel, referred to as the pilot channel, on the reverse link. The reliability of the channel estimation and demodulation procedures is proportional to the quality of the received pilot channel. The quality of the pilot channel is proportional to the power with which it is received, and inversely proportional to the combined power of the received powers of all the signals interfering with it.

In order to ensure that the received pilot channel signal quality is acceptable, a procedure referred to as power control is employed. For each mobile user, the base station periodically assesses the signal quality from that mobile, and depending on this assessment, provides a continuous feedback to each mobile either to increase or decrease its pilot channel transmit power by a fixed amount at a regular interval of time.

Figure 1:
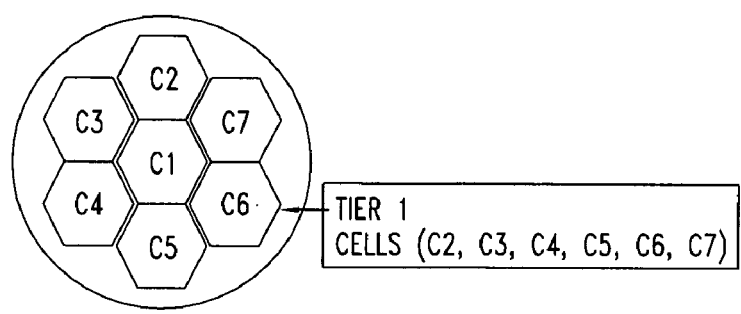
FIG. 1 shows a cluster of cells having a center cell surrounded one tier of surrounding cells.
Figure 2:
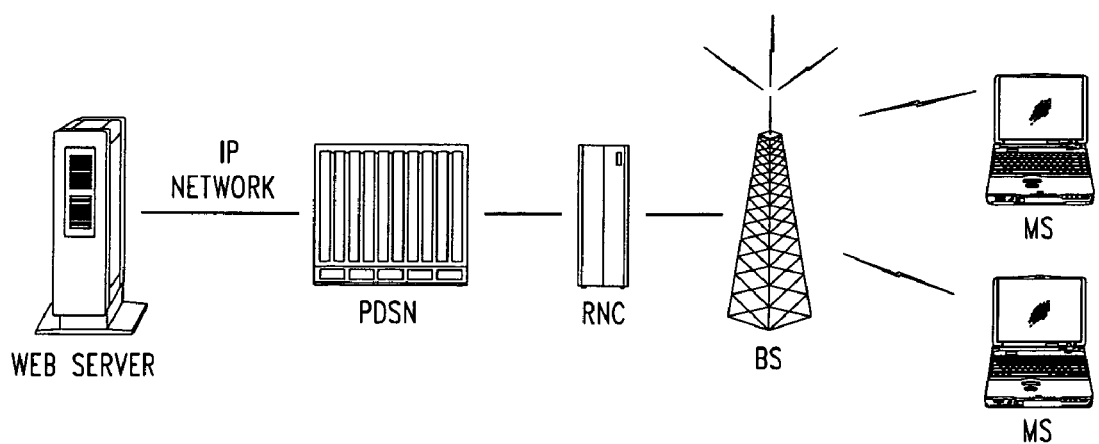
FIG. 2 illustrates an example of a network in an embodiment of the present invention.

In addition to the pilot channel, mobile users may transmit a few other channels on the reverse link. All channels originating from a user are transmitted in parallel. For each channel other than the pilot channel, the transmit power is a multiple of the transmit power of the pilot channel. This multiple is referred to as the channel-to-pilot ratio, which can be any positive real number. For each channel, the mobile uses pre-defined default values of the channel-to-pilot ratio, designed to lead to an acceptable reception of that channel under average conditions. For data mobiles, the channel that carries user data or payload is referred to as the data channel. The data channel is transmitted based on instructions from the base station. The timing relationship between the instant the scheduling decision is made at the BS to allow a particular mobile to transmit its data on the reverse link and the instant the mobile begins its transmission is based on a scheduling a method utilized in the system. This scheduling decision in other embodiments could be made at a Radio Network Controller (RNC) or the Mobile Switching Center (MSC), or a Media Gateway as seen in FIG. 2.

The decision as to which data user or users to schedule for transmission on the RL is taken periodically at the base station. The (periodic) time instants at which the scheduling decisions are made are referred to as scheduling instants, and the time periods between them are referred to as the scheduling intervals.

The scheduling of a particular user (or users) is made at the BS based on the expected availability of the resources at the base station at the time of RL transmission from the scheduled user (users). The decision to allow a user (users) to start their transmissions on a RL is decided a priori and this decision is informed to specific mobile (mobiles) via a message called "Schedule Grant". This Schedule Grant message is combined with transmission rate and transmission interval information. These parameters are directly governed by the expected level of power at the base station by these scheduled users. As mentioned earlier, the goal of the system design is to make sure that every received user signal is decodable in the presence of an accumulated sum of the total interference caused by other users in the system.

The BS makes certain measurements to aid in the resource allocation process over equally spaced time intervals. These time intervals will be referred to as measurement intervals. In a typical embodiment of the present invention the BS is the controlling entity in the data channel resource assignment process. As seen in FIG. 3, the sequence of operations at each scheduling instant is as follows:

Based on the measurements in the latest measurement interval (T0–T1), the base station decides which data user(s) out of the eligible data user population may transmit, and with what transmission resource(s), on the data channel on the RL. The eligible users are those that meet certain criterion based on the quality of service or subscriber profile status or pre-set real-time needs.

The base station conveys the decision(s) to the selected user(s) using a message at T2.

After certain propagation and processing delay (T3–T4), the selected users start their transmissions.

The transmission begins at T4 with the assigned resource usage.

At the end of the data transmission at T5, the base station processes the signal and determines if it is erroneous or not. Typically, for data transmissions (as opposed to voice), the base station sends an acknowledgement (or negative acknowledgement or other pre-determined protocol response) to inform the user of the efficacy of the transmission. This allows the user to know whether the transmission was successful or not. If the transmission was not successful, then the base station may or may not discard the received signal. If the received signal is NOT discarded, then the base station may choose to combine it with future receptions of the same information block from the mobile station thereby increasing the probability of success of decoding that specific packet. The protocol, which allows for combining of signals across multiple transmissions, is referred to as Hybrid-Automatic Request (HARQ).

The scheduling of a particular user (users) is made at a BS based on the expected availability of the resources at the time of RL transmission from the scheduled user (or users). This resource consists of transmission rate and transmission interval. These parameters are directly governed by the expected received power level contribution by these scheduled users. As mentioned earlier, the goal of the system design is to make sure that every received user signal is decodable in the presence of accumulated sum of total interference caused by other users in the system. When the assigned data users start transmitting, the pilot channel of each of them is interfered with by the received signals of the other data users. This leads to a deterioration of the received pilot channel signal quality, prompting the power control mechanism to order the mobile users to increase their pilot channel transmit powers. Additionally, aside from the anticipated increase in interference due to the assigned data users' bursts, the current received value of the pilot signal power itself may be low and unsatisfactory in comparison with a certain desired value due to the rapidly changing nature of the radio link between MS and BS.

The rate of change of the pilot transmit powers (and hence of the improvement in received pilot channel signal quality) afforded by power control is slow and hence unable to track either the surge in interference or a deep fade in the channel if there is one. Hence, in situations where the assigned transmission time interval is relatively short, the improvement of the pilot channel signal quality during the duration of the transmission due to power control may not be sufficient for satisfactory channel estimation. In this context, "short" is defined relative to the frequency and granularity of the power control command. In other words, if the pilot channel signal quality has to be raised by say four units of power but the transmission is only for two units of time then the gradual improvement of the pilot channel performed by the power control loop is only two units of power which is below the required power level. More generally, when the expected receive power in the pilot channel is lower than a pre-defined threshold; the base station will not be able to estimate the channel properly. This erroneous channel estimation would result in a failure of the received data decoding. In a case when the received pilot power is adequate for the channel estimation but the data channel to pilot power ratio (DCPR) is below the required value, the data detection will be failed. In other words, both PCTP and DPPR have to meet certain threshold values for proper channel and data detection. Hence, the problems to be solved, in order to improve the chances of successful transmission are:

Realize a scheme to effect sharp changes in Mobile Station pilot channel transmit power (PCTP), coordinated with the start of the reverse link data channel transmissions. The change in pilot power may be applicable to systems, which use multiple pilots as well, and in the presence of multiple antennas at the transmitter and receiver.

Realize a scheme to effect adequate reverse link data channel-to-pilot ratio (DCPR) that works independent of the number of transmit and receive antennas used.

Both schemes above should work well in the presence of hybrid ARQ (HARQ) protocols as well and should be transparent to the mobile station.

This resource allocation method calculates the mobile pilot channel transmit power and the mobile data channel-to-pilot ratio (DCPR) as a part of the transmission resource, and conveys this data to the scheduled data users the actual pilot channel transmit power (PCTP) to use at the start of transmission, and the data channel-to-pilot ratio (or the offset from the default value of the appropriate data channel-to-pilot ratio from pre-determined look-up table) to use during transmission.

Based on the measurements in the latest measurement interval, the base station decides which data user(s) out of the eligible data user population may transmit, and with what transmission resource, on the data channel on the reverse link. The transmission resource includes the pilot channel transmit power (absolute power) or adjustment thereof to be used at the start of the transmission, and the data channel-to-pilot ratio (or an offset from the default value of the appropriate data channel-to-pilot ratio). These quantities could be absolute quantities or relative to a certain predefined datum value that is known to both the transmitter and receiver. In addition, the predefined datum value may be specific to the transmission rate as well as shown in Table 1.

TABLE 1

| Rate, Kbps | Duration, ms | Pilot reference level, dB | TPR, dB |
|---|---|---|---|
| 9.6 (convolutional) | 20 | 0 | 3.75 |
| 19.2 (turbo) | 20 | 0.25 | 5.5 |
| 38.4 (turbo) | 20 | 1.25 | 7 |
| 76.8 (turbo) | 20 | 2.375 | 8.5 |
| 153.6 (turbo) | 20 | 4.125 | 9.5 |
| 307.2 (turbo) | 20 | 6.25 | 11 |

The method of defining of bits budgeted in a field (fixed or variable) to indicate the pilot channel transmit power and data channel-to-pilot ratio adjustment factors is flexible based on the system design.

EXAMPLES FOR PCTP AND DCPR ARE

Pilot boost/de-boost is picked from a pre-defined set of eight values as shown {−3, 0, 3, 5, 6, 7, 8, 9} dB. This arrangement requires a bit field length of 3 bits.

DCPR is picked from a pre-defined set of 16 values as shown [−15, 0] in the steps of 1 dB. The above arrangement requires a bit field length of 4 bits. The base station conveys the scheduling decision(s) to the scheduled user(s). For the data users scheduled for a transmission, the resource assignment includes the pilot transmit power or an adjustment factor to the current pilot transmit power to use at the start of the transmission, and the data channel-to-pilot ratio (or the offset from the default value of the appropriate data channel-to-pilot ratio) to use during transmission. After certain propagation and processing delay, the assigned data users start their transmissions. At the start of the transmission, the user transmits the pilot channel at the power level (or adjustment) indicated in the resource assignment message. After that, the power control mechanism takes over and regulates the pilot channel transmit power for the rest of the data transmission The data channel-to-pilot ratio used during transmission is that indicated in the resource assignment message.

We claim:

1. A method in a wireless communication system comprising:
   prior to the start of a scheduled data transmission on a data channel on a reverse link, transmitting information for controlling the power of a pilot on the reverse link to be used at the start of the scheduled data transmission, and transmitting information from which a data channel-to-pilot power ratio to be used during the scheduled data transmission can be determined, the information for controlling the power of the pilot channel and the information from which a data channel-to-pilot power ratio can be determined being based on measurements made at least in part in a latest measurement interval.

2. The method of claim 1 wherein the information for controlling the power of the pilot to be used at the start of the scheduled data transmission is an absolute power to be used.

3. The method of claim 1 wherein the information for controlling the power of the pilot to be used at the start of the scheduled data transmission is information for adjusting a pilot transmit power positively, negatively, or not at all.

4. The method of claim 3 wherein the information for adjusting the pilot power positively, negatively, or not at all is selected from a predefined set of a plurality of values.

5. The method of claim 3 where the adjustment is relative to a predefined datum value.

6. The method of claim 5 wherein the predefined datum value is specific to a transmission rate of the scheduled transmission.

7. The method of-any of claim 1 wherein the information from which a data channel-to-pilot channel power ratio can be determined is an absolute ratio to be used for the scheduled data transmission.

8. The method of claim 1 wherein the information from which a data channel-to-pilot channel power ratio can be determined is a positive, negative or zero offset from a default data channel-to-pilot ratio.

9. The method of claim 7 wherein the data channel-to-pilot channel power ratio is one of a predefined set of values.

10. The method of claim 8 wherein the default data channel-to-pilot ratio is specific to a transmission rate of the scheduled transmission.

* * * * *